United States Patent [19]

Kusumoto

[11] Patent Number: 5,357,109
[45] Date of Patent: Oct. 18, 1994

[54] PROBE FOR SCANNING TUNNELING MICROSCOPE AND MANUFACTURING METHOD THEREOF

[75] Inventor: Osamu Kusumoto, Sakai, Japan

[73] Assignee: Matsushita Electric Industrial Co., Ltd., Osaka, Japan

[21] Appl. No.: 65,899

[22] Filed: May 25, 1993

[30] Foreign Application Priority Data

Jun. 3, 1992 [JP] Japan ................... 4-142401

[51] Int. Cl.⁵ .......................... H01J 37/26
[52] U.S. Cl. ................... 250/306; 250/307
[58] Field of Search ................. 250/306, 307

[56] References Cited

U.S. PATENT DOCUMENTS 4,943,720  7/1990  Jones .................. 250/306

FOREIGN PATENT DOCUMENTS 0437275  7/1991  European Pat. Off. .
0475559  3/1992  European Pat. Off. .
0530473  3/1993  European Pat. Off. .
2-171601  7/1990  Japan .
90/15986 12/1990  World Int. Prop. O. .

OTHER PUBLICATIONS

Holl Musselman, Inga and Phillip E. Russell, "Platinum/iridium tips with Controlled Geometry for Scanning Tunneling Microscopy," Journal of Vacuum Science and Technology, vol. 8, No. 4, Jul. 1990, pp. 3558-3562.

Kaneko, Reizo and Shigemitu Oguchi, "Ion-Implanted Diamond Tip for a Scanning Tunneling Microscope," Japanese Journal of Applied Physics, vol. 29, No. 9, Sep. 1990, pp. 1854-1855.

*Primary Examiner*—Paul M. Dzierzynski
*Assistant Examiner*—Kiet T. Nguyen
*Attorney, Agent, or Firm*—Fish & Richardson

[57] ABSTRACT

A probe for a scanning tunneling microscope and manufacturing method therefor in which tetrapod-shaped whiskers of zinc oxide are placed on a conductive material which is adhered on a tip part of a fine wire of platinized iridium in a manner that three legs of the tetrapod contact the conductive material; the conductive material is heated for melting only the conductive material; and cooling the melted conductive material for being hardened, thereby the stem part of the whisker is inserted into the conductive material.

8 Claims, 2 Drawing Sheets

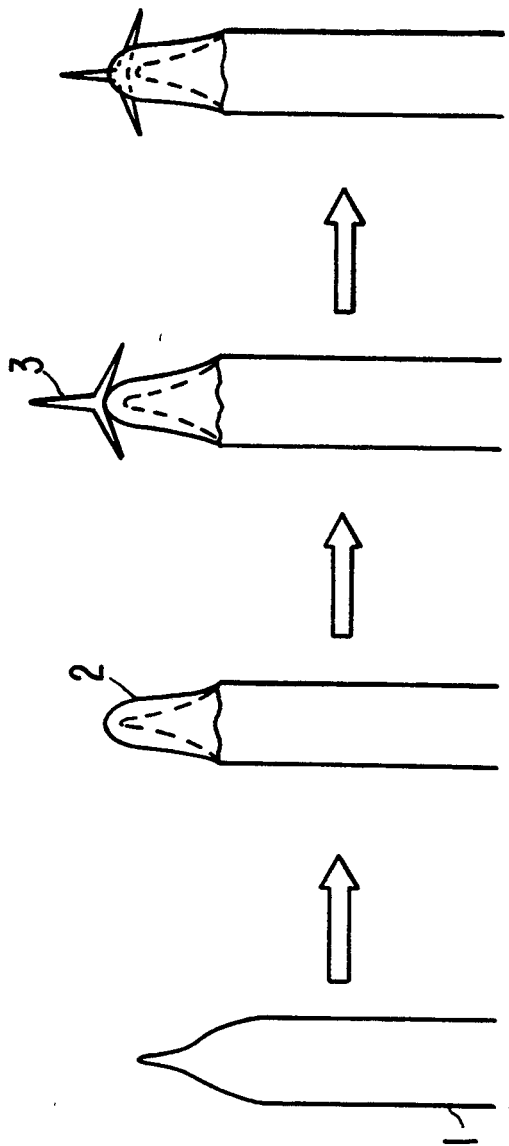

PROBE FOR SCANNING TUNNELING MICROSCOPE AND MANUFACTURING METHOD THEREOF

FIELD OF THE INVENTION

The present invention relates to an improvement of a probe for scanning tunneling microscope, and especially relates to the probe and manufacturing method thereof wherein a sharp tip of the probe has a very small radius of curvature and a very small cone angle.

BACKGROUND OF THE INVENTION

Recently, the scanning tunneling microscope (hereinafter abbreviated as STM) has been developed for observing the surface structure of a solid sample down to the atomic level. In the STM, when a sharp pointed probe is brought within a distance of about 1 nm from the sample surface and a predetermined bias voltage is applied between the sample and the probe, a tunneling current flows between them. The intensity of the tunneling current is very sensitive to the distance between the sample and the probe. The probe is scanned over the sample surface in parallel with the sample surface by being controlled up and down in a direction perpendicular to the sample surface for keeping the intensity of the tunnel current at a predetermined value. By doing this, the unevenness of the sample surface can be observed by the trail of the probe.

The lateral resolution of the STM depends on how small the region of the sample is from which the tunneling current can flow, and that is defined by the radius of curvature of the probe tip. Furthermore, in the case of scanning a sample surface having a deep groove, when the cone angle of the probe tip 21 is larger as shown in FIG. 2(a), the probe tip 21 cannot reach to the bottom of the groove, and the tunneling current-flows between the edges of the groove and the side face of the probe. Therefore, the trail 24 of the motion of the probe does not reflect the shape of the sample surface 23. On the other hand, when the cone angle of the probe tip 21' is much smaller as shown in FIG. 2(b), the probe tip 21' can reach to the bottom of the groove, and thereby the trail 24' of the motion of the probe tip 21' sufficiently reflects the shape of the sample surface 23. Accordingly, it is desirable that the probe for STM have a very small radius of curvature and a very small cone angle at the tip part thereof.

Conventionally, such a probe for STM is made by sharpening the tip part of a fine wire made of tungsten, platinum or the like by electrolytic polishing or mechanical polishing. And it is known that the probe has a tip of less than 50 nm in radius of curvature with a cone angle ranging from 10 to 20 degrees at the tip part thereof (Journal of Vacuum Science & Technology A8(4), 3558–3562, 1990).

It, however, is difficult to manufacture the probe having a tip of less than 50 nm in radius of curvature with less than 10 degrees in cone angle artificially with reproducibility. Therefore, one having a predetermined shape is selected among the mass-produced probes in actual case.

On the other hand, there is known in nature a needle crystal having a tip of less than 50 nm in radius of curvature with less than 10 degrees in cone angle. In the needle crystal, such a very sharp tip is formed in a manner to have the most stable state in each step of the grain growth of the crystal. Therefore, there is not a large difference between the shapes of the individuals of a needle crystal. Accordingly, it is desirable to use such needle crystals to provide the probes for STM with reproducibility.

The very problem of the needle crystal in use of the probe for STM has the dimensions of the needle crystal. It is, in general, necessary that the probe has a length of about 10 mm since it is to be mounted on a main frame. However, such a lengthy needle crystal having a very small radius of curvature at the tip part thereof does not exist naturally. The length of the needle crystal is about 100 μm at most. Accordingly, when a needle crystal is used as a probe for STM, the needle crystal must be fixed on a tip of a fine wire of metal having a sufficient length. Since STM detects the tunneling current flowing between a sample and a probe, it is necessary to have good conductivity between the needle crystal and the fine wire of metal.

The simplest method for fixing the needle crystal to the fine wire of metal is using a conductive adhesive such as silver paste. At first, the silver paste is spread on the tip part of the fine wire of metal, and the needle crystal is pushed onto the silver paste. Thereby, the needle crystal is adhered on the tip part of the fine wire of metal. At this time, if the needle crystal is strongly pushed onto the fine wire of metal, the silver paste might be adhered at the tip part of the needle crystal, or the needle crystal might be broken. Therefore, it is necessary to push the needle crystal weakly onto the fine wire of metal. On the contrary, when the silver paste is spread on the tip of the fine wire of metal, the surface of the silver paste becomes dry soon (for example within one minute), and a thin film forms on the surface of the silver paste, so that the adhesion of the needle crystal becomes difficult. Therefore, it is necessary to contact the needle crystal on the silver past as quickly as possible after spreading the silver paste at the tip part of the fine wire of metal. The probe configured above is dried an entire day and night, and after that the probe is generally used for observing the sample by STM. The needle crystal, however, is not compatible with the silver paste, that is the contact resistance between the needle crystal and the silver paste is large and the tunneling current can not flow between them stably. Furthermore, since the adhered area of the needle crystal and the fine wire of metal is small, even when the needle crystal contacts the sample softly, the needle crystal can be disconnected from the fine wire of metal.

SUMMARY OF THE INVENTION

The purpose of the present invention is to solve the above-mentioned problems and to provide an improved probe for STM having a tip of less than 50 nm in radius of curvature with less than 10 degrees in cone angle, and to provide a method for manufacturing the probe on a new basis.

To solve the above-mentioned problems, the probe for STM in accordance with the present invention has a needle crystal fixed at a tip part of a conductive fine wire via a metallic conductive material which has a melting point lower than the melting point of the material of the fine wire and lower than the melting point or sublimation point of the needle crystal.

The method for manufacturing the probe in accordance with the present invention includes the following steps: a conductive material having a melting point lower than the melting point of the material of a conductive fine wire and lower than a melting point or a sublimation point of a needle crystal is adhered to a tip part of the fine wire; the needle crystal is adhered to the surface of the conductive material; the temperature of the conductive material is increased to a range which is higher than the melting point of the conductive material and lower than the melting point of the material of the fine wire and lower than the melting point or the sublimation point of the needle crystal so that only the conductive material is melted; and the temperature of the conductive material is decreased to a temperature lower than the melting point thereof for hardening the conductive material under the condition that the needle crystal is wetted by the melted conductive material.

As mentioned above, the present invention utilizes the needle crystal which exists in nature as it is, so that the probe for STM having features less than 50 nm in radius of curvature with less than 10 degrees in cone angle at a tip part thereof is easily and reproductively manufactured. Furthermore, in the method of manufacturing the probe for STM of the present invention, since only the conductive material is melted under the condition that the needle crystal is adhered on the surface of the conductive material and the needle crystal is wetted by the melted conductive material, it is not necessary to push The needle crystal onto the fine wire by applying any force. The needle crystal is thus inserted in the conductive material without being broken, and the conductivity between the needle crystal and the fine wire and the mechanical strength on the connection are increased in comparison with the conventional case which uses a conductive adhesive for fixing the needle crystal onto the fine wire. Furthermore, in the conventional case, since the conductive adhesive is generally made by mixing a fine powder of metal or carbon in an organic solvent, it is necessary to leave the probe untouched for several hours or more after adhesion of the needle crystal on the fine wire for allowing the organic solvent to evaporate. On the contrary, in the present invention, since the melted conductive material becomes immediately hard when the temperature of the conductive material becomes lower than the melting point thereof, time period which is necessary for manufacturing one probe becomes much shorter, and the probe can soon be used for observing a sample by STM.

BRIEF DESCRIPTION OF THE DRAWINGS

FIG. 1 is a production drawing showing a preferred embodiment of manufacturing of a probe for STM in accordance with the present invention.

DETAILED DESCRIPTION OF THE INVENTION

Figure 2A:
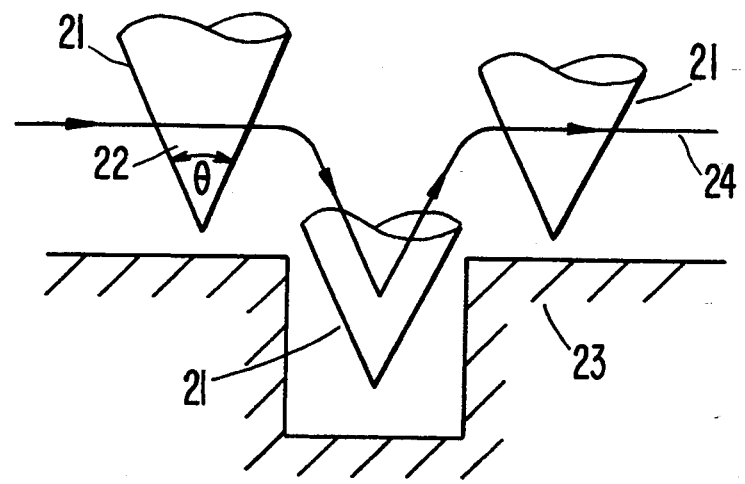
FIGS. 2(a) and 2(b) are sectional side views schematically showing the relations between the cone angles of the probe tips and the STM images in case of scanning the sample surface having a deep groove by the STM.
Figure 2B:
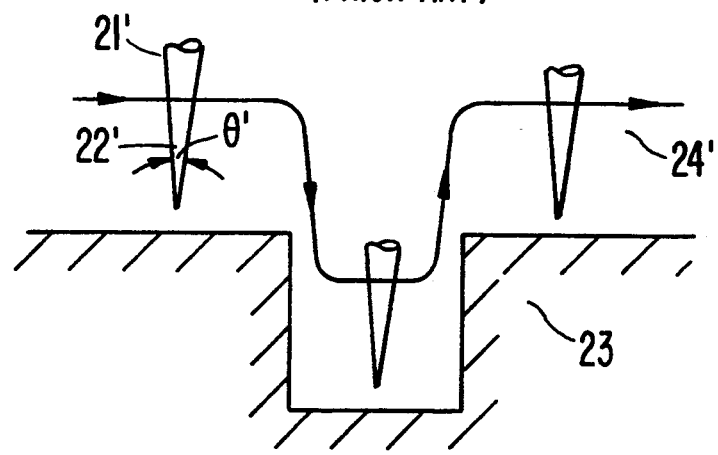

A preferred embodiment of a probe for scanning tunneling microscope and manufacturing method thereof in accordance with the present invention is described referring to FIG. 1. FIG. 1 is a production drawing for manufacturing the probe For STM in this embodiment.

In this embodiment, tetrapod-shaped whiskers of zinc oxide are fixed at a tip part of a fine wire of platinized iridium by using indium. Since the whiskers of zinc oxide are n-type semiconductors and have a resistivity of 7 $\Omega$ cm, it is usable as a material for the probe of STM. The sublimation point of the zinc oxide is 1,720 degrees centigrade. The melting point of platinized iridium (platinum 80 at % and iridium 20 at %) is 1,820 degrees centigrade, and the melting point of indium is 156.5 degrees centigrade.

The tip part of the fine wire of platinized iridium having a diameter of 0.2 mm is sharpened by electrolytic polishing, and a radius of curvature at the tip part is made to be less than 1 $\mu$m shown by step (a) in FIG. 1. The indium 2 is adhered at the tip part of the fine wire of platinized iridium by using a soldering iron shown by step (b) in FIG. 1.

Next, the whiskers of zinc oxide are dispersed on a surface of a slide glass. The whiskers are observed by optical microscope, and one which is completely dispersed to be one body and has a length of about 50 $\mu$m is selected from the plural whiskers on the slide grass. The selected whiskers 3 of zinc oxide are adhered on the surface of the indium 2 at the tip part of the fine wire 1 of platinized iridium by using a micropositioner shown by step (c) in FIG. 1. Since the whiskers 3 of zinc oxide have the tetrapod shape, three legs of the whiskers 3 are contacted to the indium 2 and the remainder is oriented in the same direction as the fine wire 1.

Under such a condition, the fine wire 1 of platinized iridium is placed upright in a manner that the tip part is positioned to the top, and the heated soldering iron is put on just below the tip part in 30 seconds for melting the indium 2. After that, the indium 2 is naturally cooled to reach to room temperature. As a result, the whiskers 3 of zinc oxide are fixed on the fine wire 1 in a manner that the crossing part of four legs is inserted into the indium 2 shown by step (d) in FIG. 1.

Ten probe for STM were manufactured by the above-mentioned method. When the region of 6 nm $\times$ 6 nm on a highly oriented pyrolyric graphite sample was observed by the STM using respective probes, clear atomic images were obtained in every case. Furthermore, when the same diffraction grating having grooves of 1 $\mu$m in height and 1 $\mu$m in width was observed by using these same probes, substantially the same shapes were obtained by every case. Such obtained shape was also substantially coincident with the shape obtained in the observation of the section of the sample by a scanning electron microscope (hereinafter abbreviated as SEM). When the tip parts of the probes for the STM were observed by SEM after using in STM observation, the radii of curvature at the tip parts of the probes were about 5 nm and their cone angles were in the range of 5 to 10 degrees.

When indium-tin alloy, tin-lead alloy and the like were used instead of indium, good results similar to the result of the above-mentioned embodiment were obtained. Furthermore, when whiskers of silicon carbide, tungsten, iron or the like were used instead of the whiskers of zinc oxide, good results similar to the result of the above-mentioned embodiment were obtained.

On the contrary, when the region of 6 nm $\times$ 6 nm on the highly oriented pyrolyric graphite sample was observed by the STM of using a probe which was made by adhering the whiskers of zinc oxide on the fine wire of platinized iridium by silver paste, the atomic image was obtained only over a part of the field of view. Furthermore, occasionally the whiskers of zinc oxide were detached from the fine wire of platinized iridium during the STM observation.

As mentioned above, the probes for STM with tips of less than 50 nm in radius of curvature with less than 10 degrees in cone angle at the tip part thereof are reproductively and easily obtained by the present invention. Furthermore, by using the probes for STM, the atomic images are stably obtained, and the shape of a sample such as a diffraction grating which has a deep groove is precisely measured.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the forgoing description, and all changes which come within the meaning and range of equivaleney of the claims are intended to be embraced therein.

What is claimed is:

1. A probe for a scanning tunneling microscope, comprising a needle crystal fixed to a tip part of a conductive fine wire via a metal-conductive material which has a melting point lower than a melting point of a material of the fine wire and lower than a melting point or a sublimation point of the needle crystal.

2. A probe for a scanning tunneling microscope in accordance with claim 1, wherein said metal-conductive material is a metal or an alloy having as a main component indium or tin.

3. A probe for a scanning tunneling microscope in accordance with claim 1 or 2, wherein a tip part of said needle crystal has a radius of curvature of less than 50 nm and a cone angle of less than 10 degrees.

4. A probe for a scanning tunneling microscope in accordance with claim 1 or 2, wherein said needle crystal comprises tetrapod-shaped whiskers of zinc oxide.

5. A method for manufacturing a probe for scanning tunneling microscope, comprising the steps of: adhering a conductive material having a melting point lower than a melting point of a material of a conductive fine wire and lower than a melting point or a sublimation point of a needle crystal to a tip part of said fine wire; adhering said needle crystal on a surface of said conductive material; increasing the temperature of said conductive material to a temperature in a range which is higher than said melting point of said conductive material and lower than said melting point of said material of said fine wire and lower than said melting point or said sublimation point of said needle crystal so as to melt only said conductive material; and decreasing the temperature of said conductive material to a temperature lower than said melting point of said conductive material for hardening said conductive material so that said needle crystal is wetted by said melted conductive material.

6. A method for manufacturing a probe for scanning tunneling microscope in accordance with claim 5, wherein said conductive material is a metal or an alloy having as a main component indium or tin.

7. A method for manufacturing a probe for scanning tunneling microscope in accordance with claim 5 or 6, wherein a tip part of said needle crystal has a radius of curvature of less than 50 nm and a cone angle of less than 10 degrees.

8. A method for manufacturing a probe for scanning tunneling microscope in accordance with claim 5 or 6, wherein said needle crystal comprises tetrapod-shaped whiskers of zinc oxide.

* * * * *